July 4, 1933.    G. E. NICHOLSON    1,917,145
DEAD WEIGHT GAUGE
Filed March 15, 1930    2 Sheets-Sheet 1

INVENTOR
George E. Nicholson
BY Arthur C. Brown,
ATTORNEY

July 4, 1933.  G. E. NICHOLSON  1,917,145
DEAD WEIGHT GAUGE
Filed March 15, 1930　　2 Sheets-Sheet 2
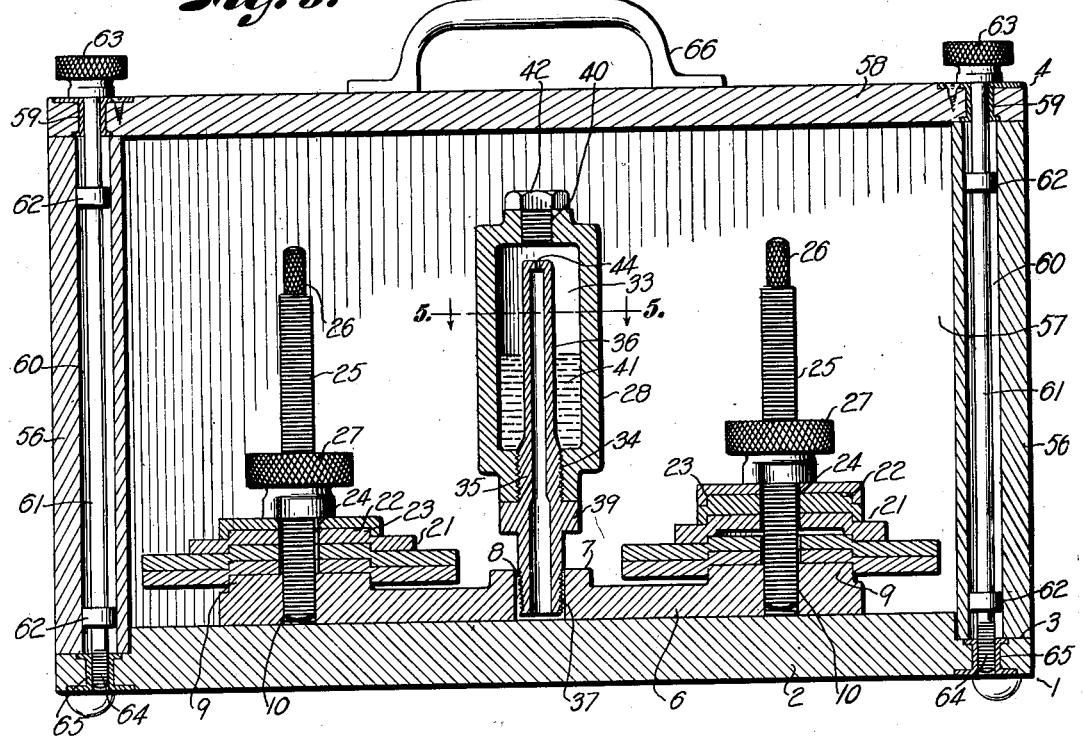
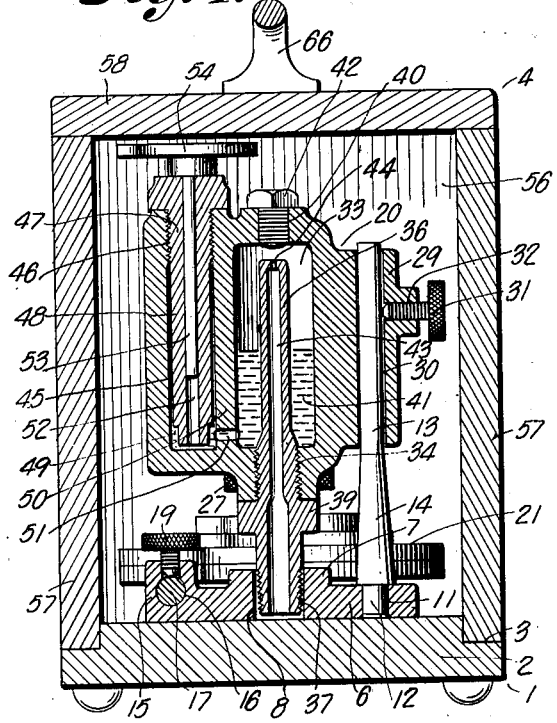
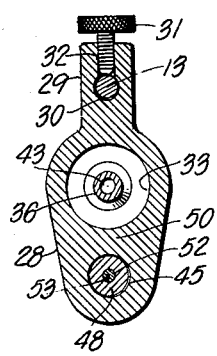
INVENTOR
*George E. Nicholson*
BY *Arthur C. Brown*
ATTORNEY Patented July 4, 1933

1,917,145

UNITED STATES PATENT OFFICE

GEORGE E. NICHOLSON, OF TULSA, OKLAHOMA, ASSIGNOR, BY MESNE ASSIGNMENTS, TO REFINERY SUPPLY COMPANY, OF TULSA, OKLAHOMA

DEAD WEIGHT GAUGE

Application filed March 15, 1930. Serial No. 436,053.

My invention relates to gauges and more particularly to dead weight gauges for determining gas pressures in service lines, gas wells etc.

Devices commonly used for this purpose are of relatively delicate structure employing springs subject to inaccuracies incident to conveyance of the instrument, temperature changes, and other causes. For this reason it is necessary to frequently check the ordinary device with comparatively heavy and expensive dead weight gauges in order to ascertain the degree of accuracy of the instrument and to make adjustments as required.

It is the principal object of my invention to provide a light portable dead weight gauge of simple and inexpensive construction to obviate the necessity and inconvenience of counter-checking the instrument at frequent intervals.

In accomplishing this and other objects of my invention I have provided improved details of structure the preferred form of which is illustrated in the accompanying drawings wherein:

Fig. 3 is a central longitudinal cross sectional view of the cabinet, gauge and weights.

Fig. 4 is a central transverse cross-sectional view of the cabinet and gauge.

Fig. 5 is a cross-section on the line 5—5 Fig. 3.

Figure 1:
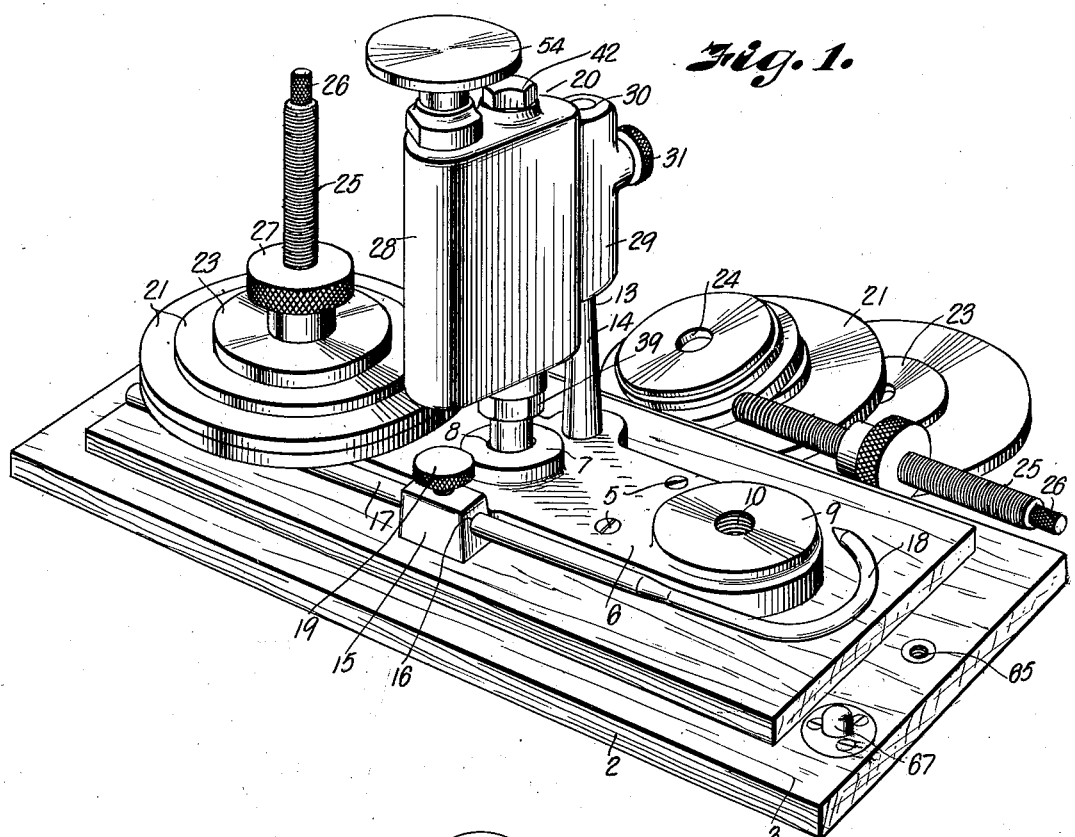
Fig. 1 is a detail perspective view of parts embodying my invention, including one set of weights mounted on a base, a second set of weights being illustrated in dismounted condition.
Figure 2:
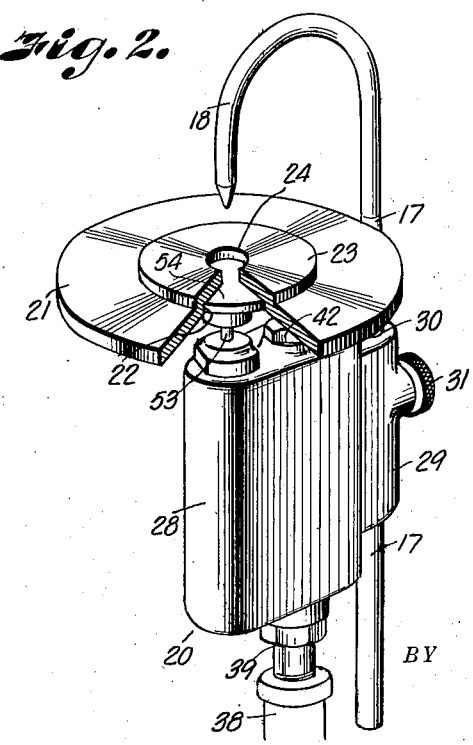
Fig. 2 is a view in perspective of the gauge in functional position on a gas line, illustrating a weight and a weight retainer mounted on the gauge, a portion of the weight being broken away to better illustrate other parts.

Referring more in detail to the drawings:

1 designates a cabinet preferably constructed of wood, and including a bottom or floor 2, having a peripheral offset ledge 3, for receiving a cover member 4, later to be described.

Mounted on the floor and fixed thereto by screws 5 is a base 6 having a central boss 7 provided with an opening 8, and annular end bosses 9 having internally threaded concentric apertures 10. In transverse alignment with the central boss is an opening 11 for receiving the reduced end 12 of a supporting post 13 having a lower outwardly tapering portion 14.

Integral with the base edge opposite the vertical post, and in alignment with the central opening 11 is a rectangular boss 15 having a longitudinal bore 16 for receiving a retainer bar 17 terminating in a hook 18 for a purpose presently set forth, and secured therein by a set screw 19 threaded laterally into the boss.

The opening 8 and post 13 are provided for supporting a dead weight gauge generally designated 20 and later described in detail, and the bosses 9 and threaded apertures 10 serve to mount weights 21 of various sizes.

Each weight is provided with an annular socket 22 in its lower face and with a corresponding annular boss 23 on its upper face so that the plates may be interseatingly positioned upon each other or upon an annular boss 9 of the base member.

The plates are further provided with concentric apertures 24 for receiving bolts 25 threaded into the apertures 10 of the bosses 9, the upper end of each bolt being knurled as at 26 to facilitate rotation thereof. In order to retain a number of weights in assembled position a locknut 27 on the bolt 25 is threaded into firm engagement with the weights.

The gauge 20 includes a rectangularly shaped casing 28 having a lateral boss 29 provided with a longitudinal bore 30 for mounting the casing on the post 13. A set screw 31 threaded into a lateral opening 32 in the boss serves to secure the casing on the post.

The casing is further provided with a central annular chamber 33 terminating at its lower end in an internally threaded opening 34 for receiving the screw threaded portion 35 of a conduit 36 projecting upwardly into the chamber throughout the greater portion thereof. The lower end of the conduit is externally threaded as indicated at 37 for operably connecting the gauge with a service line 38 or the like, a hexagonal flange 39 being provided on the conduit for threading the conduit into the casing and for mounting the casing on a service line.

In the upper end of the casing and aligning with the conduit 36 is a filler opening 40, for introducing a sealing liquid 41 into the chamber, said opening being normally closed by a plug screw 42.

A channel 43 extending throughout the conduit is constricted adjacent its upper end, forming an orifice 44 to allow free flow of gas or like fluid into the chamber, but to prevent flow of liquid from the chamber into the conduit.

The casing is also provided with a chamber 45 parallel to the chamber 33 and extended downwardly therein to a level with the lower extremity of the chamber 33. The upper end of the chamber 45 is internally threaded as at 46 for engaging the threaded portion 47 of a cylinder 48 extending downwardly into the chamber 45 to a point near the lower end wall of the chamber. The diameter of the lower end of the cylinder is reduced as at 49 to form an annular recess at the bottom of the chamber 45. A partition wall 50 between the chambers 33 and 45 is provided adjacent its lower end with a transverse port 51 for affording communication between the chambers.

A concentric bore 52 in the cylinder 48 slidably receives a plunger 53 extending downwardly into the bore throughout the greater distance thereof, and carrying on its outer end a head 54 of a diameter complementary to the diameters of the sockets and bosses wherewith the weights 21 are provided.

When the gauge is to be used for testing line pressures it is removed from the supporting post and connected to a service line or the like. A weight of predetermined coefficient ratio to a known pressure is then mounted on the head 54.

Should the fluid pressure in the line be in excess to that anticipated, the plunger would be raised suddenly, throwing the weight from off the head. To prevent upward projection of the weight, the bore 30 is utilized for receiving the retainer bar 17 provided with the hook portion 18 extended upwardly over the weight.

With the gauge weights and retainer bar mounted on the base, the parts are enclosed by the cover 4 seated on the offset ledge 3 of the cabinet floor and now to be described in detail.

The cover comprises end walls 56, side walls 57, and a cover plate 58. Extending through sleeves 59 in the cover plate and through vertical bores 60 in the end walls 56 are rods 61 provided with guide collars 62, and on their upper ends with knurled heads 63. The lower ends of the rods are threaded as at 64 for engaging internally threaded sleeves 65 in the offset ledge 3 of the floor. The cover is further provided with a handle 66 and with a socket engaging a positioning boss 67 fixed in the ledge.

Assuming an apparatus to be constructed and assembled within a cabinet as described the operation for testing fluid pressure in a line or the like would be as follows:

After removing the cover the gauge is dismounted from the supporting post and attached to a suitable fitting in the line. Weights of sufficient corresponding value to balance a given line pressure are removed from the base and positioned on the head of the plunger. The retaining bar is then mounted in the casing, its hooked portion extending over, but spaced from, the weights. Fluid from the line is admitted under pressure into the gauge, flowing through the conduit into the first chamber, through the port in the partition wall into the second chamber, and exerting pressure against the inner end of the plunger to elevate the plunger and head.

The level of the sealing liquid, preferably oil is maintained in the chambers and bore approximately one-half the height thereof, for providing a sealing relation between the plunger and bore of the cylinder.

If the line or other source of pressure is sufficient to sustain elevated position of the plunger and superimposed weight the coefficient value of the weight determines the amount of pressure in the line.

Obviously with more or less pressure, greater or smaller weights are selected respectively and positioned on the head until a perfect balance is obtained between the weight and fluid pressure.

What I claim and desire to secure by Letters Patent is:

1. In combination with weights having concentric sockets, and a casing having spaced chambers and a port for affording communication between the chambers, a conduit extending upwardly into one chamber for admitting fluid to said chamber, a plunger reciprocably mounted in the other chamber and adapted to be elevated by fluid entering the last mentioned chamber through said port, a head on the plunger complementary to the weight sockets for supporting a weight on said head, and means for preventing the weight from accidentally detaching from the head upon sudden rise of the latter.

2. In combination, a casing having a pair of spaced chambers, a partition wall between said chambers having a port for affording communication between the lower portion of the chambers, means for admitting fluid into one chamber, a plunger mounted in the other chamber and adapted to be elevated through action of pressure fluid entering the last named chambers through said port, and a retaining bar connected to the casing for limiting upward movement of the plunger.

3. In a device of the character described a casing having spaced chambers and a port for affording communication between the lower portion of the chambers, a conduit extending upwardly into one chamber and having a constricted outlet into the chamber, a cylinder mounted in the other chamber and having a longitudinal bore opening at its lower end into the chamber, and a plunger slidably mounted in the bore and adapted to be elevated by fluid entering the chamber through said port.

4. In a dead weight gauge, a casing having a chamber for a pressure fluid and also having an outlet port for the fluid, a cylinder communicating with said chamber and having a recess communicating with said port, means for supporting the cylinder, a plunger slidably mounted in the cylinder and responsive to the pressure of said fluid, and pressure indicating means including a weight and a head on the plunger adapted to support the weight concentrically of the plunger.

5. In a dead weight gauge, a casing including an elongated chamber having a closed upper end and an outlet port near its lower end, and a parallel chamber communicating near its lower end by said port with the first-named chamber and having a closed lower end, a conduit extending upwardly into the first-named chamber in spaced relation with said closed upper end, a cylinder extending downwardly into the other chamber in spaced relation with said closed lower end and having an annular recess surrounding its lower end portion in alignment with the port, said cylinder having a bore opening at its lower end into the chamber, and a plunger slidably mounted in the bore and adapted to be elevated by fluid entering the chamber through said port.

6. In a device of the character described, a vertically disposed casing provided with a first chamber and a second chamber, a port placing the lower portions of said chambers in communication with one another, a first tubular member extending upwardly through the bottom of the casing and having a restricted outlet at its upper end arranged in close proximity to but spaced from the top of the first chamber, means at the lower end of said member for connecting the same with a service line, a second tubular member projecting downwardly through the top of the casing into the second chambers, and having a bore, the inlet of the bore being arranged adjacent to said port, a stem slidable in the bore, and a weight supporting head carried by the stem.

7. In a device of the character described, a vertically disposed casing provided with a first chamber and a second chamber, a port placing the lower portions of said chambers in communication with one another, a first tubular member extending upwardly through the bottom of the casing and having a restricted outlet at its upper end arranged in close proximity to but spaced from the top of the first chamber, means at the lower end of said member for connecting the same with a service line, a second tubular member projecting downwardly through the top of the casing into the second chamber and having a bore, the inlet of the bore being arranged adjacent to said port, a stem slidable in the bore, a weight supporting head carried by the stem, and a sealing liquid arranged in the lower portions of the chambers.

8. In a device of the character described, a vertically disposed casing provided with a first chamber and a second chamber, a port placing the lower portions of said chambers in communication with one another, a first tubular member extending upwardly through the bottom of the casing and having a restricted outlet at its upper end arranged in close proximity to but spaced from the top of the first chamber, means at the lower end of said member for connecting the same with a service line, a second tubular member projecting downwardly through the top of the casing into the second chamber and having a bore, the inlet of the bore being arranged adjacent to said port, a stem slidable in the bore, and a weight supporting head carried by the stem, said tubular members being detachably connected to the casing.

9. In a device of the character described, a vertically disposed casing provided with a first chamber and a second chamber, a port placing the lower portions of said chambers in communication with one another, a first tubular member extending upwardly through the bottom of the casing and having a restricted outlet at its upper end arranged in close proximity to but spaced from the top of the first chamber, means at the lower end of said member for connecting the same with a service line, a second tubular member projecting downwardly through the top of the casing into the second chamber, and having a bore, the inlet of the bore being arranged adjacent to said port, a stem slidable in the bore, a weight supporting head carried by the stem, and a hook-shaped retaining bar connected to the casing and having an end positioned above said head.

In testimony whereof I affix my signature.

GEORGE E. NICHOLSON.